United States Patent Office 3,173,243
Patented Mar. 16, 1965

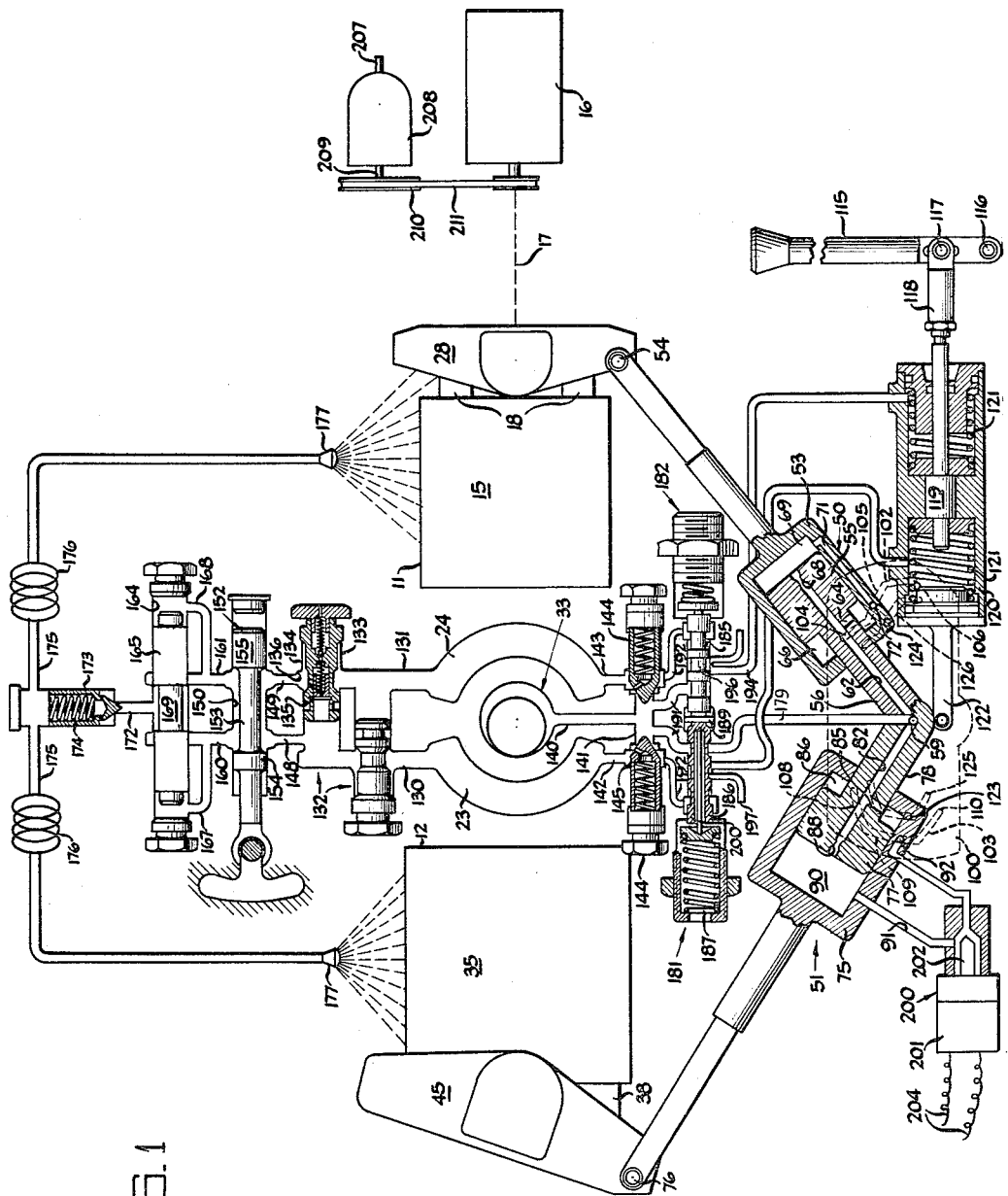

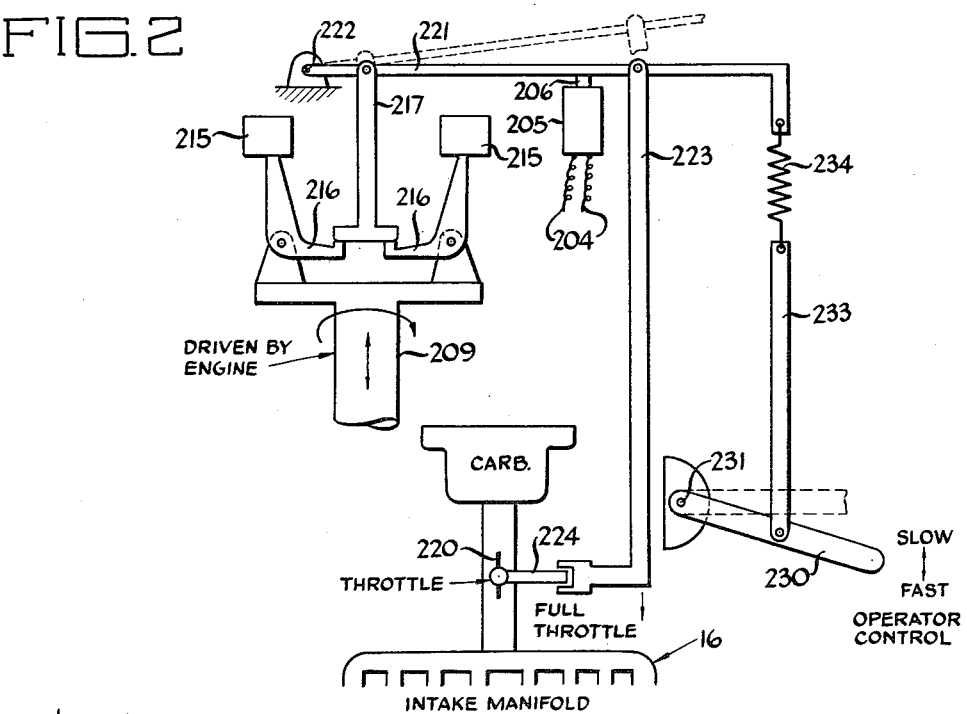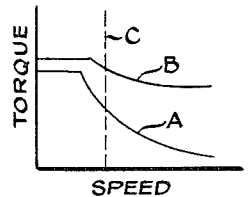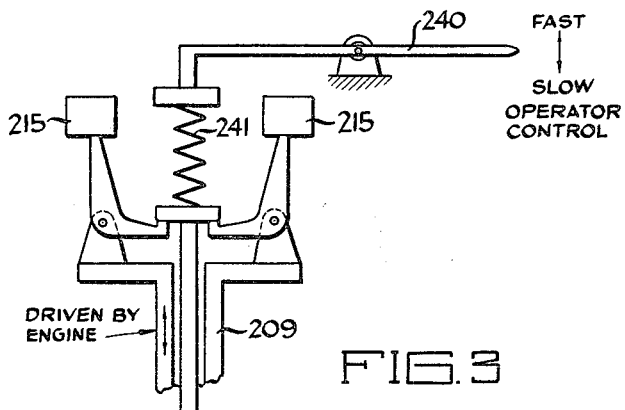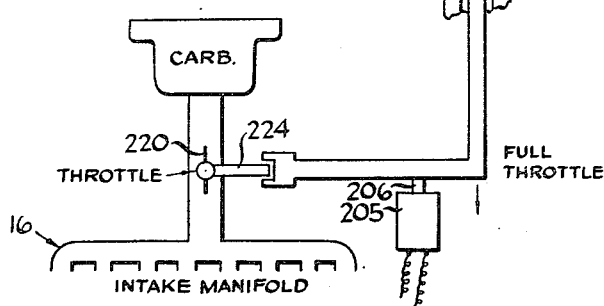

3,173,243
ELECTRIC OVERRIDE
Donald B. Reinke, Rockford, Ill., assignor to Sundstrand Corporation, a corporation of Illinois
Filed Aug. 19, 1963, Ser. No. 302,965
15 Claims. (Cl. 60—19)

This invention relates to a hydrostatic transmission particularly suited for use as a propelling means in a vehicle of a slow moving, hard working type, such as an industrial tractor or a farm tractor, and in particular the invention relates to an improved control means for such a transmission.

It is a general object of the invention to provide a new and improved control means for a transmission of the type described.

A more specific object is to provide a new and improved control means for a hydrostatic transmission including means responsive to engine speeds for varying the hydraulic motor displacement to maintain the engine at a peak horsepower speed and prevent stalling of the engine in response to excess loads imposed on the transmission.

In a specific embodiment, the control includes rotary governor means driven by the engine and controlling the engine throttle for the purpose of maintaining a constant or substantially constant engine speed, and also controlling a displacement varying means for the hydraulic motor so that when the speed of the engine drops to a predetermined value while calling for increased speed, the displacement of the motor is increased in a manner to increase the torque output thereof and relieve the load on the engine so its speed returns to the desired normal.

It is also an object of this invention to provide a new and improved hydrostatic transmission including a control means responsive to pressure increase in the system due to increased load on the hydraulic motor for increasing the motor displacement in the upper portion of the torque range and the lower portion of the speed range of the motor, together with control means responsive to engine speed decrease due to increased load on the engine for increasing the displacement of the motor in the lower portion of the torque range and the upper portion of the speed range of the motor.

Other objects and advantages will become apparent from the following detailed description taken in connection with the accompanying drawings, in which:

FIG. 1 is a diagrammatic view illustrating mechanical and fluid circuit features of a transmission embodying the present invention;

FIG. 2 is a diagrammatic illustration of a portion of a control embodying the present invention;

FIG. 3 illustrates an alternative embodiment of the control means shown in FIG. 2; and FIG. 4 is a showing of curves illustrating operating characteristics of a typical transmission embodying the controls of the present invention.

While the invention is susceptible of embodiment in many different forms, there is shown in the drawings and will be described in detail herein an embodiment of the invention with the understanding that the present disclosure is to be considered as an exemplification of the principles of the invention and is not intended to limit the invention to the embodiment illustrated.

The scope of the invention will be pointed out in the appended claims.

The present invention is embodied in a transmission of the type described rather completely in the copending application of Hann et al., Serial No. 95,078, filed March 13, 1961, now Patent No. 3,126,707, granted March 31, 1964, and assigned to the assignee of this application, and reference may be had to such application for more detailed illustrations of physical features of various system components illustrated diagrammatically herein.

Preferably, the transmission includes a housing not shown in which there is positioned a pump 11 and a motor 12. The pump 11 includes a rotatable cylinder block 15 formed with a plurality of axial cylinder bores respectively housing reciprocable pistons 18. The cylinder block is adapted to be driven by an engine as illustrated diagrammatically at 16 and connected as illustrated diagrammatically at 17 for rotating the cylinder block. As is conventional in pumps of the type illustrated, the cylinders in the cylinder block are provided with ports through the end of the block adapted for cooperation with arcuately shaped inlet and outlet ports 23 and 24 in a suitable housing member so that as the cylinder block rotates fluid is admitted to and exhausted from the cylinders in the block.

Outer ends of the pistons 18 cooperate with a swashplate 28 pivotable in opposite directions from a minimum displacement neutral center position to maximum displacement positions at opposite sides of the center position in order to vary the displacement of the pump and provide reversible flow through the pump. That is, either of the arcuate ports 23 and 24 may function as inlets or outlets, depending upon the position of swashplate 28. Drive means 17 for rotating the pump usually includes suitable gearing for driving a makeup pump illustrated diagrammatically at 33, which may be of a conventional gear type.

The motor 12 is similar to the pump 11, but somewhat larger as illustrated, and includes a cylinder block 35 rotatably mounted and adapted for suitable connection with an output shaft. Herein, it is contemplated that such output shaft would be suitably connected with the propelling wheels or tracks of a tractor or similar vehicle. Cylinder block 35 is formed with cylinders therein housing reciprocable pistons 38, and the cylinders include cylinder ports at the end of the block adapted for cooperation with inlet and outlet arcuate ports 23 and 24 previously mentioned. Outer ends of the pistons 38 cooperate with a swashplate 45 variable between a minimum displacement position and a maximum displacement position illustrated in FIG. 1.

The swashplates 28 and 45 are controlled respectively by similar piston and cylinder devices 50 and 51. The device 50 includes a cylinder 53 pivotably connected as at 54 to the swashplate 28 to pivot the latter as the cylinder slides on a piston 55 having a piston rod 56 pivotal about a fixed axis represented by bore 59 subsequently referred to.

In operation, control fluid under pressure is supplied constantly to the piston and cylinder device 50 by makeup pump 33 through passages including the axial bore 59 communicating with a passage 62 in the piston rod and piston. The passage 62 is connected by a radial port 64 to a chamber 66 at one side of the piston 55 in the cylinder 53. The passage 62 also communicates through a restrictive orifice 68 with a chamber 69 at the opposite side of the piston 55 in the cylinder 53. Chamber 69 communicates with a passage 71 terminating in a restrictive valving port 72.

It will be understood that if the port 72 is closed, the pressure in chamber 69 eventually will equal that in the chamber 66, and due to the larger piston area exposed in the chamber 69, the cylinder 53 will be moved toward the right in FIG. 1, pivoting the swashplate 28 in a counterclockwise direction. On the other hand, if the port is opened, the reduced pressure in the chamber 69 as compared to that of the chamber 66 permits the latter pressure to move the cylinder 53 to the left as viewed in FIG. 1 pivoting the swashplate in a clockwise direction. In this manner, the swashplate 28 may be pivoted in either direction from the neutral center position illustrated in FIG. 1. In operation, a static position is desirably obtained by partially opening and partially closing the port 72 so that the product of the reduced pressure in chamber 69 acting against the relatively larger piston area is equal to the relatively greater pressure in chamber 66 acting against the relatively smaller piston area.

The means controlling the opening and closing of the valve port 72 will be described presently.

The piston and cylinder device 51 controlling the motor swashplate 45 is similar to the device 50, and includes a cylinder 75 pivotably connected to the swashplate 45 as at 76 and slidable on a piston 77 including a piston rod 78 pivotably mounted about the axis 59. Fluid is supplied to the piston and cylinder device 51 through the passage 59 and a passage 82. Passage 82 communicates through a radial port 85 with a chamber 86 at one side of the piston 77 and communicates through a restrictive passage 88 with a chamber 90 at the opposite side of the piston 77. Chamber 90 communicates with a passage 91 terminating in a valving port 92 controlled in a manner to effect pivotal movement of the motor swashplate between a minimum displacement position and the maximum displacement position illustrated in FIG. 1.

Flow of fluid from the valving ports 72 and 92 is controlled by a cam-shaped valve plate 100 pivotably mounted for movement about the axis of bore 59. In a preferred arrangement, the plate 100 is formed with a slot or groove therein as at 102 having a radially inner peripheral edge controlling the port 72 for varying the pump swashplate angle and a slot or groove 103 having a radially inner peripheral edge for controlling the port 92 to vary the motor swashplate angle.

For purposes of controlling the sequence of operation in varying the angles of the pump and motor swashplates to stage the operation of the two in a preferred manner in varying the speed of the transmission, the slot 102 is preferably formed with an end portion 104 concentric with the pivot axis, a central portion 105 which is eccentric to the pivot axis, and an end portion 106 concentric with the pivot axis. In operation, when the transmission is at rest, the plate 100 is normally positioned as illustrated in FIG. 1, with the port 72 at the midportion of the inner peripheral edge of the slot portion 105. This results in positioning the pump swashplate 28 at the neutral minimum displacement center position. It will be understood that if the plate 100 is pivoted in a clockwise direction about its axis, the shape of the slot portion 105 is such that the port 72 is uncovered, resulting in a greater pressure in the chamber 66 than in the chamber 69 and the consequent movement of the cylinder 53 to the left as viewed in FIG. 1 with an attendant pivoting of the swashplate 28 in a clockwise direction from the position illustrated in FIG. 1. This results in operation of the transmission in a direction which may be described as forward. On the other hand, if the plate 100 is pivoted in a counterclockwise direction, the formation of the slot portion 105 is such that the port 72 will be closed, resulting in an increase in pressure in chamber 69 such that the cylinder 53 moves toward the right as viewed in FIG. 1 with a consequent pivotal movement of the swashplate 28 in a counterclockwise direction from the neutral position. This results in operation of the transmission in a reverse direction.

Obviously, with the port 72 positioned in either end of the slot portion 105, movement of the plate 100 back toward the position shown in FIG. 1 will result in returning the swashplate 28 to the neutral position.

At opposite ends of the slot portion 105 the slot portions 104 and 106 are substantially concentric about the axis of the shaft 57 so that movement of these slot portions relative to the port 72 does not effect an adjustment of the swashplate 28. As will appear presently, slot portions 104 and 106 enable retention of the swashplate in maximum displacement positions while continued movement of the plate 100 is utilized to vary the angle of the motor swashplate 45. The slot 103 controlling the port 92 is formed with the central slot portion 109 substantially concentric with the axis of the shaft 57 and opposite end portions 108 and 110 which are not concentric with the axis of the shaft 57, but are relied upon for varying the angle of the swashplate 45. Angularly about the pivot axis of the piston rods, the length of the slot portion 109 corresponds to the length of the slot portion 105 while the lengths of the slot portions 108 and 110 correspond respectively with the length of slot portions 104 and 106. Thus, in operation when a transmission is at rest, the port 92 is positioned at the midpoint in the inner periphery of the slot portion 109. Upon movement of the plate 100 in either direction from the position shown in FIG. 1, the swashplate 45 remains in the maximum displacement position illustrated during the time the port 92 encounters the slot portion 109. It will be understood that this provides for retention of the swashplate 45 in a maximum displacement position while the pump swashplate 28 is moved from a minimum displacement position to a maximum displacement position.

When the port 92 encounters the inner periphery of either slot portion 108 or 110, the port 92 will be uncovered, resulting in a pressure drop in the chamber 90 sufficient to enable movement of the cylinder 75 toward the right as viewed in FIG. 1 and consequent movement of the swashplate 45 in a counterclockwise direction toward a minimum displacement position. At this time, the port 72 encounters the concentric slot portion 104 or 106 so that the pump swashplate remains in a maximum displacement position while the motor swashplate is moved toward a minimum displacement position.

The operation described above results in bringing the transmission up to speed by first varying the pump swashplate from a minimum displacement position to a maximum displacement position and then varying the motor swashplate from a maximum displacement position to a minimum displacement position. Conversely, when the speed of the transmission is reduced, the motor swashplate is first moved from a minimum displacement position to a maximum displacement position, and the pump swashplate is then moved from a maximum displacement position toward a minimum displacement position. It should be understood that the staging described, while referred in connection with the specific embodiment illustrated, is merely exemplary and may be varied if desired. For example, the valving portions of the plate 100 may be arranged in a manner such that some or all of the motor swashplate adjustment may overlap or coincide with adjustment of the pump swashplate.

Pivotal movement of the plate 100 is controlled by a manually operable control including a handle 115 pivotably mounted as at 116 and pivotably connected at 117 to a link 118 which is a piston rod connected to a piston 119 in a movable cylinder 120 normally maintained in a center position on the piston 119 by centering springs 121. The cylinder 120 is in turn connected by a link 122 to pivot the plate 100.

In operation, the springs 121 are sufficiently strong that manual movement of the handle 115 and consequent movement of the piston 119 cause movement of the cylinder 120 and the plate 100 all together without relative movement between the piston 119 and the cylinder 120. Thus, the transmission may be brought up to speed or reduced in speed by movement of the handle 115. The piston and cylinder device 119, 120, however, provides an override control responsive to the pressure in the closed circuit between the pump and motor for overriding the manual operation in cases where the pressure rise in the circuit is sufficient as explained in more detail hereinafter.

Guide pins 123 and 124 secured respectively to the cylinders 53 and 75 fit slots 125 and 126 in plate 100 corresponding in shape respectively with the valving slots 102 and 103.

To elaborate on the circuit, arcuate ports 23 and 24 communicate respectively with passages 130 and 131, each communicating with a high pressure relief valve as at 132. Each relief valve 132 includes a sleeve member 133 housing a piston member 134 urged by spring 135 toward a valve closing position, wherein the piston closes ports 136. Piston member 134 is movable against the biased spring 135 for relieving excessively high pressure in either of the ports 23 and 24 to the other of the ports.

The makeup pump 33 draws fluid from a suitable reservoir and supplies such fluid to the low pressure side of the circuit in excess of makeup requirements for purposes of cooling. Due to the close coupled nature of the pump and motor, the fluid does not pass through long pipes or conduits which effectively provide cooling loops. The fluid thus may become excessively heated. The supply of fluid by the makeup pump in quantities in excess of that required for makeup purposes is utilized to force heated fluid from the low pressure side of the circuit. The makeup pump 33 delivers fluid through a conduit 140 to branch passages provided by a bore 141. The bore 141 communicates with branch passages 142 and 143 leading respectively to the arcuate ports 23 and 24. Communication between the conduit 140 and the branch passages 142 and 143 is normally prevented by spring pressed makeup check valves 144 urged against valve seats at opposite ends of the bore 141. Each of the valve members 144 is provided with one or more ports as at 145 communicating respectively with the passages 142 and 143 so that pressure in the high pressure port of the ports 23 and 24 is effective to maintain the associated check valve closed, while fluid from the makeup pump forces the other valve open, admitting makeup and cooling fluid to the low pressure port of the ports 23 and 24.

Makeup fluid in excess of that required for makeup purposes forces heated fluid from the low pressure port 23 or 24 through the associated passage 130 or 131 to one of passages 148 and 149 communicating respectively with the passages 130 and 131. Passages 148 and 149 communicate with a bore 150 having a "neutral" valve member 152 slidable therein. Valve member 152 is provided with a reduced central portion 153 between enlarged pistons 154 and 155 at opposite ends of the valve member.

In operation, when the transmission is at rest, the valve member 152 is positioned as illustrated to connect the passages 148 and 149, thereby communicating the high pressure and low pressure sides of the transmission, to assure that the transmission will remain inoperative. When the transmission is to be set in operation, valve member 152 is moved axially, toward the left as viewed in FIG. 1, for example, to position the piston portion 155 between the ports communicating with the passages 148 and 149 to block communication between such passages. The low pressure and high pressure sides of the circuit are thereby isolated to permit operation of the transmission. Movement of the valve member 152 may be controlled by suitable interconnection with the previously mentioned handle 115 which, for the purposes described, may be mounted for pivotal movement about two axes at right angles to each other in a manner which need not be illustrated in detail herein.

Valve bore 150 for the neutral valve member 152 communicates with passages 160 and 161 respectively aligned with the passages 148 and 149 and leading to a valve bore 164 housing a valve member 165 which functions as a shuttle valve. Valve member 165 is normally spring centered as shown in FIGURES 1 and 4, but opposite ends of the valve member are exposed to fluid pressure in the passages 160 and 161, by means of branch passages 167 and 168, so that fluid in the high pressure conduit is effected to shift the valve member 165 to a position in which a reduced central portion 169 thereon connects either the passage 160 or the passage 161, whichever is the low pressure passage, to a relief passage 172 leading to a relief valve 173 normally urged to a closed position by the spring 174 but movable to an open position by pressure of fluid in the low pressure conduit to exhaust heated fluid from the closed circuit.

Heated fluid flowing through the relief valve passes to branch conduits 175, through cooling loops as at 176 and then to spray heads as at 127 for discharging the then cooled fluid over the pump and motor mechanisms respectively. The fluid is thereby returned to the interior of the housing which may act as the reservoir for the makeup pump.

Shuttle valve 165 is preferably spring centered in order to assure return of the valve member to the neutral center position blocking communication of the passages 160 and 161 with the passage 172 during the interval when the transmission may be in the process of being shifted from forward to reverse, or vice versa, from reverse to forward. In the interim, since both of the passages 160 and 161 are substantially blocked, it may be desirable to provide a relief valve associated with the makeup passage 140 to thereby relieve the pressure of makeup fluid until such time as the shuttle valve is shifted by the buildup of pressure in the high pressure side of the conduit, but no such valve is shown herein.

In order to provide for operation of the piston and cylinder devices 50 and 51, respectively controlling the angles of the swashplate 28 on the motor swashplate 45, control fluid under pressure is supplied by the makeup pump 33 to the passage 59 by any suitable conduit means which may be as shown diagrammatically at 179. The passage 179, as shown, leads from a port in one of a pair of separate torque multiplication and overpressure controls 181 and 182 to be described presently, but it will be understood that the conduit may lead directly from the makeup pump to the passage 59 if desired.

The torque and overpressure controls 181 and 182 are pressure-responsive valves controlled by pressure increase in the ports 23 and 24 and in turn controlling the flow of pressure fluid from the makeup circuit to the override control 119, 120 which may function to take over operation of the transmission from the manual control 115.

Each of the control valves 181 and 182 includes a bore as at 185 receiving a valve member 186 urged by spring 187 toward a normal position in which the valve member abuts a stop pin 189. Passages 191 communicate with the makeup passages 140 and 141 and respectively with the valve bores 185. Passages 192 communicate at one end with the passages 142 and 143 and at the opposite ends respectively with the valve bores 185 at positions spaced axially from the passages 191. Passages 194 lead respectively from the bores 185 to opposite ends of the override cylinder 120.

In operation, the valve members 186 are normally positioned as illustrated so that the override cylinder passages 194 communicate respectively with annular grooves 196 in the valve member 185, connecting the passages 194 to drain as at 197 so that opposite ends of the cylinder 120 are exposed to drain pressure and the cylinder remains centered on the piston 119 by virtue of the spring means 121.

It will be recalled that high pressure in one of the ports 23 and 24 maintains the associated check valve 144 in the closed position illustrated so that such high pressure fluid is conducted through the associated passage 192 to act against an enlarged piston portion 200 on the associated valve member 186 while the corresponding piston portion of the other valve member is exposed to relatively lower makeup fluid pressure by virtue of the open check valve 144. Thus, if the pressure rises sufficiently in the high pressure conduit 192, the valve member 186 may be moved against the pressure of spring 187 to a position blocking communication between the cylinder passage 194 and the drain passage 197 and communicating the control fluid passage 191 with the cylinder passage 194 to admit pressure fluid to one end of the override cylinder 120, causing movement of the cylinder relative to the piston.

The controls 181, 182 and the controls 119, 120 are calculated to function on excessive pressure increase in the high pressure conduit under two conditions, namely, in the case where the transmission is operating at undetermined speed and an increased load is encountered, causing a pressure increase, and in the case where the manually operable control 115 is moved rather rapidly from a neutral position toward a high speed position, increasing pump displacement rather rapidly at a time when the motor resists rapid speed increase due to the inertia of the vehicle associated with the transmission.

The override controls are also calculated to function on reducing the speed of the transmission, where the manual control 115 is moved rather rapidly from a high speed position toward a neutral position. This results in slowing the motor at a time when the vehicle has a certain momentum which tends to drive the motor as a pump. The motor, thus functioning as a pump, tends to drive the pump as a motor. There is a consequent pressure increase in the low pressure conduit which may become sufficient to bring the override controls into operation.

Considering first the overload situation, assume that the manual control 115 (FIG. 1) is pivoted in a counterclockwise direction, pivoting the plate 100 in a clockwise direction and the pump swashplate 28 in a clockwise direction, followed by pivotal movement of the motor swashplate 45 in a counterclockwise direction. This places the transmission in operation at a predetermined speed. If now, the tractor encounters an increased load condition, pressure in the high pressure conduit increases due to the increased resistance of the motor to turn. If the pressure in the port 24, the pressure port under these conditions, rises above a predetermined value, the valve member 186 associated with the port 24 is shifted toward the right as viewed in FIG. 1 by virtue of the pressure acting through the passage 192 against the left side of the piston portion 200 of the right hand valve 182. This valve movement places the passage 191 in communication with the passage 194 to admit control fluid to the right end of the override cylinder 120, shifting the cylinder toward the right as viewed in FIG. 1, even though the handle 115 remains in the counterclockwise position. The movement of the cylinder 120 toward the right results in pivoting the valving plate 100 in a counterclockwise direction. The first effect of the counterclockwise movement of the plate 100 is to increase the angle of the motor swashplate 45 toward a maximum displacement position to increase the torque, while reducing the speed, in an effort to overcome the increased load. If the increased load is not overcome by the increased torque, continued movement of the valving plate 100 in a counterclockwise direction results in returning the pump swashplate 28 toward a minimum displacement position so that transmission becomes stalled, but without continuing operation of the pump which would result in pumping fluid over the high pressure relief valve 132, and a consequent loss of power.

It will be understood that the override controls are equally effective when the transmission is being operated reversely, without a detailed description.

Considering now the situation where the transmission is being brought up to speed, let it be assumed that handle 115 is moved rapidly in a counterclockwise direction from the position as shown in FIG. 1, pivoting the valving plate 100 in a clockwise direction. As previously described, the first effect of the clockwise movement of plate 100 is to increase the angle of the pump swashplate 28 toward a maximum displacement position. If this occurs rather rapidly, while the tractor is at rest, the inertia of the tractor places a considerable load on the motor 12, resulting in a pressure increase in the high pressure port 24. If the pressure rises above a predetermined value, again it becomes sufficient to shift the valve member 186 toward the right, admitting fluid under pressure to the right end of the override cylinder 120. The cylinder moves toward the right, lagging the manually movable piston 119 which is being moved toward the left. As the transmission gains speed, the pressure in the port 24 reduces, allowing the valve member 186 to move toward a closed position, connecting opposite ends of the cylinder 120 to drain so that it may follow the piston 119. In this manner, the cylinder 120 eventually follows the piston 119, but at a controlled rate determined by the pressure in the high pressure port 24, thereby bringing the transmission up to speed at a controlled rate, by first increasing the displacement of the pump and thereafter decreasing the displacement of the motor. Again, this occurs without a substantial loss of fluid pumped over the high pressure relief valve 132, which functions primarily to relieve sudden pressure surges prior to operation of the override controls.

It will be understood that the override controls will be equally as effective in bringing the transmission up to speed in a reverse direction.

Considering the situation now where the speed of the transmission is being reduced, for example, by movement of the handle 115 from a counterclockwise position toward the neutral center position illustrated in FIG. 1. If the handle movement occurs rapidly, displacement of the motor is immediately increased, thereby reducing the motor speed. The momentum of the vehicle, however, tends to drive the motor as a pump, and in turn the pump 11 tends to be driven as a motor. Under these conditions, the low pressure port 23 becomes pressurized, and if the pressure exceeds a predetermined value, the left hand valve member 186 is shifted toward the left as viewed in FIG. 1 to admit pressure fluid to the left end of the override cylinder 120. This results in movement of the cylinder to the left relative to the piston 119, so that the former lags the latter in returning toward the neutral position. When the pressure in port 23 is thereby reduced, the cylinder 120 follows the piston 119. Thus, the transmission is brought to rest or to a reduced speed at a controlled rate, without substantial loss of fluid over the high pressure relief valve 132.

To explain the operation of the torque control valves 181 and 182 in more detail, it should be understood that in a transmission of the type described herein, when the torque output of the transmission from the motor 12 is plotted on a vertical axis versus the speed of the transmission at the motor output shaft, there will result a curve approximately as illustrated in FIG. 4 at A. Also, while there is a tendency in a transmission of the type described to maintain a somewhat level pressure, there is generally a decrease in system pressure in the low torque high speed range of transmission operation, due at least in part to the capacity of the pump to deliver a predetermined torque at a lesser pressure when in full stroke than when in a position less than full stroke, and the pressure curve may be represented approximately as illustrated at B in FIG. 4. Thus, in the upper portion of the torque range and the lower portion of the speed range of the transmission, to the left of the vertical broken line C in FIG. 4, for example, the pressure in the system is somewhat higher than in the lower portion of the torque range and the upper portion of the speed range of the transmission, to the right of the line C, for example. In the preferred arrangement, the setting of the springs 187 and the torque valves 181 and 182 is preferably such that the torque control valve responds primarily in the range of transmission operation to the left of line C.

In order to control the operation in the range of transmission operation to the right of the line C in FIG. 4, an additional control means is provided. More particularly, such control may take the form of a control valve in the passage 91 between the chamber 90 and the orifice 92 associated with the piston and cylinder device 51 for controlling the displacement of the motor 12. To this end, a solenoid operated control valve 200 includes a winding 201 controlling a valve plunger 202 normally maintained in a valve open position as illustrated in FIG. 1 on deenergization of the winding 201, for example, so that the piston and cylinder device 51 normally responds as previously described unless the valve 200 is closed.

Winding 201 of the solenoid valve is connected as by wires 204 with a control switch 205 including a switch actuator 206 illustrated in FIG. 2 which is controlled by a governor mechanism associated with the engine 16.

As illustrated in FIG. 1, a governor 208 includes a rotary input shaft 209 having a pulley as 210 connected as by gearing illustrated diagrammatically at 211 to be driven by the engine 16. Rotary input shaft 209 carries pivotally mounted flyweights 215 (FIG. 2) normally positioned as illustrated when the shaft 209 is stationary. Upon rotation of the shaft 209, the flyweights 215 tend to swing outwardly so that flyweight arms 216 move upwardly as viewed in FIG. 2 to actuate a plunger 217.

Plunger 217 is associated with a throttle 220 for the engine 16 in a manner to normally maintain the engine at a constant speed for a predetermined manually chosen setting. To this end, plunger 217 is suitably connected as to a link 221 pivotally mounted as at 222 and in turn pivotally connected with a link as at 223 having a suitable connection with a throttle arm 224 in a manner such that movement of the plunger 217 causes operation of the throttle 220.

A predetermined setting on the governor may be established by a manually or pedally accessible control as at 230 illustrated herein in the form of a lever pivotally mounted in a suitable manner as at 231 and frictionally retarded by conventional means so that the handle normally stays in the position to which it may be placed by an operator. Handle 230 is connected as by a link 233 to a tension spring 234 in turn connected to the lever 221.

In practice, the lever 230 is frequently referred to as a throttle control, but in operation it functions as a governor control for establishing a predetermined spring pressure on the governor plunger 217 which in turn controls the throttle 220.

In operation, the engine is normally started and the handle 230 is moved to a position establishing a predetermined setting on the governor plunger 217. It will be understood that movement of the handle 230 to the position illustrated, which may be described as a fast position for the engine, increases the tension on the spring 234 so that the flyweights 215 are held in the position indicated and the throttle 220 is held in the position shown until the engine reaches the predetermined fast speed desired. Now, if the engine exceeds the predetermined value, the flyweights move outwardly, overcoming the spring 234, moving the link 233 upwardly and tending to decrease the throttle opening to decrease the engine speed. Conversely, if there is a drop in engine speed from some predetermined speed setting, flyweights 215 tend to move inwardly under the urging of spring 234 moving link 223 downwardly and tending to increase the throttle opening to increase the throttle opening to increase the engine speed.

If, with the handle 230 set for a predetermined fast engine operation, the engine speed drops off and link 223 moves to increase the throttle opening, and the load on the engine is such that the engine cannot regain the speed which is called for, link 221 ultimately actuates the switch 205 upon engagement with actuator 206, thereby to close the solenoid valve 201. Upon closure of the valve 200, the flow of fluid from the chamber 90 is prevented and the cylinder 75 tends to move to the left on the piston 77 to increase the displacement of the motor thereby to provide an increased torque output from the transmission to reduce the load on the engine so that it may recover its speed.

In FIG. 3, a modified governor construction is illustrated in which a manual control 240 acts upon a compression spring 241 acting directly upon a plunger 242 connected directly to throttle arm 224. The operation is substantially the same as that described in connection with FIG. 2.

I claim:
1. In a hydrostatic transmission, a pump, a variable displacement motor, conduit means connecting the pump outlet with the motor inlet so that the pump delivers fluid to drive the motor, an engine connected for driving the pump, and means responsive to a decrease in engine speed as a result of an increase in load thereon for increasing the displacement of the motor.

2. In a hydrostatic transmission, a pump, a variable displacement motor, conduit means connecting the pump outlet with the motor inlet so that the pump delivers fluid to drive the motor, an engine connected for driving the pump, and means responsive to a decrease in engine speed as a result of an increase in load thereon for increasing the displacement of the motor in the lower portion of the torque range and the upper portion of the speed range of the motor.

3. In a hydrostatic transmission, a pump, a variable displacement motor, conduit means connecting the pump outlet with the motor inlet so that the pump delivers fluid to drive the motor, an engine connected for driving the pump, rotary governor means driven by the engine, fluid operable means for varying the displacement of the motor, manually controllable valve means for controlling the fluid operable means to establish a predetermined motor displacement, override means controlling the fluid operable means to vary motor displacement, and means controlled by the governor means and operable thereby upon decrease in engine speed to a predetermined value in response to load thereon for controlling said override means to increase motor displacement.

4. In a hydrostatic transmission, a pump, a variable displacement motor, conduit means connecting the pump outlet with the motor inlet so that the pump delivers fluid to drive the motor, an engine connected for driving the pump, throttle means controlling the speed of the engine, rotary governor means driven by the engine, fluid operable means for varying the displacement of the motor, valve means controlling the fluid operable means to vary motor displacement, and means controlled by the governor means and operable thereby upon decrease in engine speed to a predetermined value in response to load thereon for controlling said valve means to increase motor displacement.

5. In a hydrostatic transmission, a pump, a variable displacement motor, conduit means connecting the pump outlet with the motor inlet so that the pump delivers fluid to drive the motor, an engine connected for driving the pump, throttle means controlling the speed of the engine, rotary governor means driven by the engine and connected for controlling the throttle to increase the throttle opening upon a decrease in engine speed, and decreasing the throttle opening upon an increase in engine speed, thereby to normally maintain a constant engine speed, fluid operable means for varying the displacement of the motor, solenoid valve means controlling the fluid operable means to vary motor displacement, and switch means controlled by the governor means and operable thereby upon decrease in engine speed to a predetermined value in response to load thereon for controlling said solenoid valve means to increase motor displacement.

6. In a hydrostatic transmission, a pump, a variable displacement motor, conduit means connecting the pump outlet with the motor inlet so that the pump delivers fluid to drive the motor, an engine connected for driving the pump, throttle means controlling the speed of the engine, rotary governor means driven by the engine and connected for controlling the throttle to increase the throttle opening upon a decrease in engine speed, and decreasing the throttle opening upon an increase in engine speed, thereby to normally maintain a constant engine speed, fluid operable means for varying the displacement of the motor, manually controllable valve means for controlling the fluid operable means to establish a predetermined motor displacement, override valve means controlling the fluid operable means to vary motor displacement, and means controlled by the governor means and operable thereby upon decrease in engine speed to a predetermined value in response to load thereon for controlling said override valve means to increase motor displacement.

7. In a hydrostatic transmission, a pump, a variable displacement motor, conduit means connecting the pump outlet with the motor inlet so that the pump delivers fluid to drive the motor, an engine connected for driving the pump, throttle means controlling the speed of the engine, rotary governor means driven by the engine and connected for controlling the throttle to increase the throttle opening upon a decrease in engine speed and decreasing the throttle opening upon an increase in engine speed, thereby to normally maintain a constant engine speed, including spring means in the governor establishing a predetermined setting thereon which determines the predetermined speed at which the engine is normally maintained, manually operable means for adjusting the effect of the spring means to thereby adjust the speed at which the engine is maintained, fluid operable means for varying the displacement of the motor, manually controllable valve means for controlling the fluid operable means to establish a predetermined motor displacement, solenoid valve means controlling the fluid operable means to vary motor displacement, and switch means controlled by the governor means and operable thereby upon decrease in engine speed to a predetermined value in response to load thereon for controlling said solenoid valve means to increase motor displacement.

8. In a hydrostatic transmission, a pump, a variable displacement motor, conduit means connecting the pump outlet with the motor inlet so that the pump delivers fluid to drive the motor, an engine connected for driving the pump, means responsive to increased load on the motor to increase the displacement thereof in the upper portion of the torque range and the lower portion of the speed range of the motor, and means responsive to increased load on the engine for increasing the displacement of the motor in the lower portion of the torque range and the upper portion of the speed range of the motor.

9. In a hydrostatic transmission, a pump, a variable displacement motor, conduit means connecting the pump outlet with the motor inlet so that the pump delivers fluid to drive the motor, an engine connected for driving the pump, means responsive to pressure increase in said conduit means due to increased load on the motor to increase the displacement thereof, and means responsive to engine speed decrease due to increased load on the engine for increasing the displacement of the motor.

10. In a hydrostatic transmission, a pump, a variable displacement motor, conduit means connecting the pump outlet with the motor inlet so that the pump delivers fluid to drive the motor, an engine connected for driving the pump, means responsive to pressure increase in said conduit means due to increased load on the motor to increase the displacement thereof in the upper portion of the torque range and the lower portion of the speed range of the motor, and means responsive to engine speed decrease due to increased load on the engine for increasing the displacement of the motor in the lower portion of the torque range and the upper portion of the speed range of the motor.

11. In a hydrostatic transmission, a pump, a variable displacement motor, conduit means connecting the pump outlet with the motor inlet so that the pump delivers fluid to drive the motor, an engine connected for driving the pump, fluid operable means for varying the displacement of the motor, means responsive to pressure in said conduit means and controlling the displacement varying means to increase motor displacement upon pressure increase in said conduit means in the upper portion of the torque range of the motor, solenoid valve means controlling the fluid operable means to vary motor displacement, and switch means responsive to decrease in engine speed to a predetermined value in response to load thereon for controlling said solenoid valve means to increase motor displacement in the lower portion of the torque range.

12. In a hydrostatic transmission, a pump, a variable displacement motor, conduit means connecting the pump outlet with the motor inlet so that the pump delivers fluid to drive the motor, an engine connected for driving the pump, fluid operable means for varying the displacement of the motor, valve means responsive to pressure in said conduit means and controlling the displacement varying means to increase motor displacement upon pressure increase in said conduit means in the lower portion of the speed range of the motor, solenoid valve means controlling the fluid operable means to vary motor displacement, rotary governor means driven by the engine, and switch means controlled by the governor means and operable thereby upon decrease in engine speed to a predetermined value in response to load thereon for controlling said solenoid valve means to increase motor displacement in the upper portion of the speed range of the motor.

13. In a hydrostatic transmission, a pump, a variable displacement motor, conduit means connecting the pump outlet wtih the motor inlet so that the pump delivers fluid to drive the motor, an engine connected for driving the pump, fluid operable means for varying the displacement of the motor, manually controllable valve means for controlling the fluid operable means to establish a predetermined motor displacement, valve means responsive to pressure in said conduit means, override servo means responsive to the last recited valve means and controlling the first recited valve means for the displacement varying means to increase motor displacement upon pressure increase in said conduit means in the upper portion of the torque range and the lower portion of the speed range of the motor, and means controlling the displacement varying means in response to decrease in engine speed to a predetermined value in response to load thereon to increase motor displacement in the lower portion of the torque range and the upper portion of the speed range of the motor.

14. In a hydrostatic transmission, a pump, a variable displacement motor, conduit means connecting the pump outlet with the motor inlet so that the pump delivers fluid to drive the motor, an engine connected for driving the pump, throttle means controlling the speed of the engine, rotary governor means driven by the engine and connected for controlling the throttle to increase the throttle opeing upon an decrease in engine speed and decreasing the throttle opening upon an increase in engine speed, thereby to normally maintain a constant engine speed, fluid operable means for varying the displacement of the motor, solenoid valve means controlling the fluid operable means to vary motor displacement, valve means responsive to pressure in said conduit means and controlling the displacement varying means to increase motor displacement upon pressure increase in said conduit means in the upper portion of the torque range and the lower portion of the speed range of the motor, and switch means controlled by the governor means and operable thereby upon decrease in engine speed to a predetermined value in response to load thereon for controlling said solenoid valve means to increase motor displacement in the lower portion of the torque range and the upper portion of the speed range of the motor.

15. In a hydrostatic transmission, a pump, a variable displacement motor, conduit means connecting the pump outlet with the motor inlet so that the pump delivers fluid to drive the motor, an engine connected for driving the pump, throttle means controlling the speed of the engine, rotary governor means driven by the engine and connected for controlling the throttle to increase the throttle opening up a decrease in engine speed and decrease the throttle opening upon an increase in engine speed, thereby to normally maintain a constant engine speed, including spring means in the governor establishing a predetermined setting thereon which determines the predetermined speed at which the engine is normally maintained, manually operable means for adjusting the effect of the spring means to thereby adjust the speed at which the engine is maintained, fluid operable means for varying the displacement of the motor, manually controllable valve means for controlling the fluid operable means to establish a predetermined motor displacement, valve means responsive to pressure in said conduit means, override servo means responsive to the last recited valve means and controlling the first recited valve means for the displacement varying means to increase motor displacement upon pressure increase in said conduit means in the upper portion of the torque range and the lower portion of the speed range of the motor, solenoid valve means controlling the fluid operable means to vary motor displacement, and switch means controlled by the governor means and operable thereby upon decrease in engine speed to a predetermined value in response to load thereon for controlling said solenoid valve means to increase motor displacement in the lower portion of the torque range and the upper portion of the speed range of the motor.

No references cited.